(12) United States Patent
Galetti

(10) Patent No.: US 7,269,429 B2
(45) Date of Patent: Sep. 11, 2007

(54) COMMUNICATIONS PROTOCOL FOR MOBILE DEVICE

(75) Inventor: Ralph R. Galetti, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 590 days.

(21) Appl. No.: 10/310,481

(22) Filed: Dec. 5, 2002

(65) Prior Publication Data

US 2004/0203400 A1    Oct. 14, 2004

(51) Int. Cl.
*H04Q 7/20*     (2006.01)
(52) U.S. Cl. ............... 455/456.3; 455/466; 455/456.1; 455/574; 455/13.4; 455/427; 455/404.2; 342/357.12; 342/357.03; 342/357.07; 342/357.14; 342/357.17
(58) Field of Classification Search ............ 455/456.1, 455/456.3, 456.5, 427, 404.2, 466, 574, 13.4, 455/63.1, 63.3; 342/357.12, 357.03, 357.07, 342/357.17, 357.09, 357.14; 701/93, 301; 466/466
See application file for complete search history.

(56) References Cited

U.S. PATENT DOCUMENTS

| | | | | |
|---|---|---|---|---|
| 5,721,733 A | * | 2/1998 | Wang et al. | ................. 370/332 |
| 5,729,540 A |   | 3/1998 | Wegrzyn | |
| 5,742,509 A | * | 4/1998 | Goldberg et al. | ............ 701/211 |
| 5,903,235 A | * | 5/1999 | Nichols | .................. 342/357.17 |
| 5,911,120 A |   | 6/1999 | Jarett et al. | |
| 6,097,961 A | * | 8/2000 | Alanara et al. | .............. 455/466 |
| 6,185,197 B1 |   | 2/2001 | Cheung Yeung et al. | |
| 6,232,915 B1 | * | 5/2001 | Dean et al. | ............ 342/357.07 |
| 6,246,875 B1 | * | 6/2001 | Seazholtz et al. | ........ 455/432.1 |
| 6,329,946 B1 | * | 12/2001 | Hirata et al. | ........... 342/357.12 |
| 6,332,086 B2 | * | 12/2001 | Avis | ........................... 455/574 |
| 6,408,178 B1 |   | 6/2002 | Wickstrom et al. | |
| 6,437,736 B2 | * | 8/2002 | Ueda et al. | ............ 342/357.12 |
| 6,438,117 B1 |   | 8/2002 | Grilli et al. | |
| 6,459,405 B1 | * | 10/2002 | Da et al. | ................ 342/357.09 |
| 6,611,686 B1 | * | 8/2003 | Smith et al. | ................. 340/989 |
| 6,675,085 B2 | * | 1/2004 | Straub | .......................... 701/93 |
| 6,704,652 B2 |   | 3/2004 | Yi | |
| 6,185,427 B1 |   | 4/2004 | Krasner et al. | |
| 6,728,548 B1 |   | 4/2004 | Wilhoff | |
| 6,819,269 B2 | * | 11/2004 | Flick | ........................... 340/989 |
| 6,978,149 B1 | * | 12/2005 | Morelli et al. | .............. 455/522 |

* cited by examiner

*Primary Examiner*—Marceau Milord
(74) *Attorney, Agent, or Firm*—Ostrager Chong Flaherty & Broitman P.C.

(57) ABSTRACT

A communication device and method for operating the same includes a GPS receiver that periodically generates a position signal, a wireless modem transmitting or receiving messages and a controller that is coupled to the receiver and the modem. The controller discontinues operating the wireless modem when the GPS signal generates the position signal and vice versa to reduce interference with the other device.

17 Claims, 8 Drawing Sheets

COMMUNICATIONS PROTOCOL FOR MOBILE DEVICE

RELATED APPLICATIONS

The present invention is related to application Ser. No. 10/310,457 entitled "Communication System For Tracking Assets"; Ser. No. 10/310,482 entitled "Method And Circuit For Initializing Non-Volatile Memory"; Ser. No. 10/310,275 entitled "Programmable Messages For Communication System Having One-Button User Interface"; Ser. No. 10/310,410 entitled "One-Button User Interface For A Portable Device"; and Ser. No. 10/310,751 entitled "Serial Port Multiplexing Protocol"; filed simultaneously herewith and incorporated by reference herein.

TECHNICAL FIELD

The present invention relates generally to a communication system, and more particularly, to a communication protocol to maximize reliability in communications between a base station and a mobile unit.

BACKGROUND ART

Companies and governmental entities that employ mobile units often have difficulty locating the units. The units in turn often have difficulty knowing their position. In operations such as fighting forest fires or other types of wildfires, knowing the position of ground units is desirable to better manage the changing requirements for fighting the fire. A simple, reliable system for tracking assets and communicating back and forth therewith is thus desirable.

Reliability is an important factor when providing communication systems, particularly in life-threatening situations such as forest fires. Communications must be reliable. Typically, if communications in a mobile system are sent but not received, no indication is present to either party that the message has not been received.

It would therefore be desirable to provide a system that provides reliable communications and acknowledgements that messages have been received.

SUMMARY OF THE INVENTION

The present invention provides a communications protocol for controlling communications between a mobile unit and a base station.

In one aspect of the invention, a method of operating a communications device includes providing power to the device, while a wireless modem is off turning on a GPS receiver. The method further comprises waiting a predetermined amount of time and receiving a GPS signal. After the GPS signal is received, turning off the GPS receiver and turning on the wireless modem.

In a further aspect of the invention, a communication device includes a GPS receiver that periodically generates a position signal, a wireless modem transmitting or receiving messages and a controller that is coupled to the receiver and the modem. The controller discontinues operating the wireless modem when the GPS signal generates the position signal. Thereafter, the controller operates the wireless modem.

One advantage of the invention is that potential interference between the GPS receiver and the wireless modem is eliminated. This allows more reliable communication between a base station and the device as well as more reliable reception of GPS signals and hence better accuracy of position determination.

Other aspects and advantages of the present invention will become apparent upon the following detailed description and appended claims, and upon reference to the accompanying drawings.

BEST MODES FOR CARRYING OUT THE INVENTION

Figure 1:
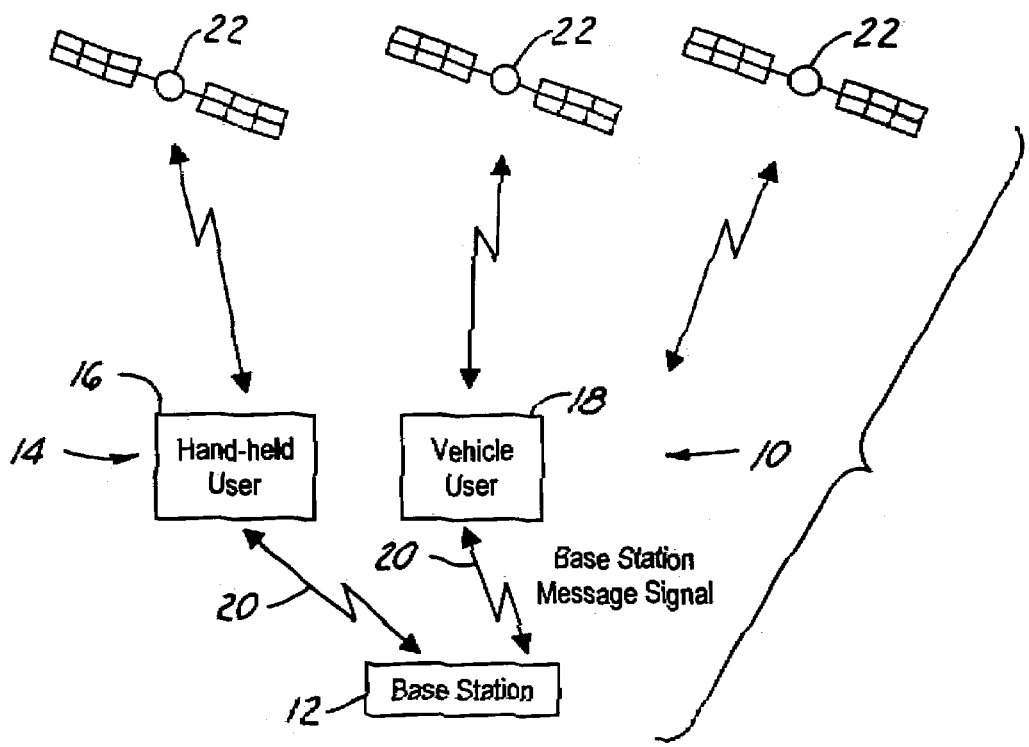
FIG. 1 is a block diagrammatic view of a communication system formed according to the present invention.

In the following figures the same reference numerals will be used to identify the same components.

The following description is illustrated and described with respect to a two-way communication system. However, the present invention has various features that may be used in other types of electronic devices including other electronic communication devices.

Referring now to FIG. 1, the communication system 10 is illustrated having a base station 12 that communicates with variable mobile units 14. The mobile units 14 illustrated are a handheld user 16 and a vehicle user 18. While only two units 14 are illustrated, several mobile units 14 may be provided in the communication system 10. For example, in one constructed embodiment, up to 999 mobile units were able to be provided. Of course, that number may be easily increased. Base station 12 and mobile units 14 communicate with each other using two-way communication signals 20.

The two-way communication signals may contain message signals, paging signals, position signal, status inquiry signals, and the like. Communication signals 20 are used to provide information from the mobile users 14 to the base station 12 and from the base station to the mobile users. The base station 12 ultimately tracks and displays the position of each of the mobile units 14.

GPS satellites 22 transmit signals that are received by mobile units 14 and base station 12 so that each may determine their position relative to the latitudinal and longitudinal positions of the earth. The global positioning system, the multitude of satellites, and the triangulation techniques to ascertain longitude, latitude, and elevation of a user are well known.

Figure 2:
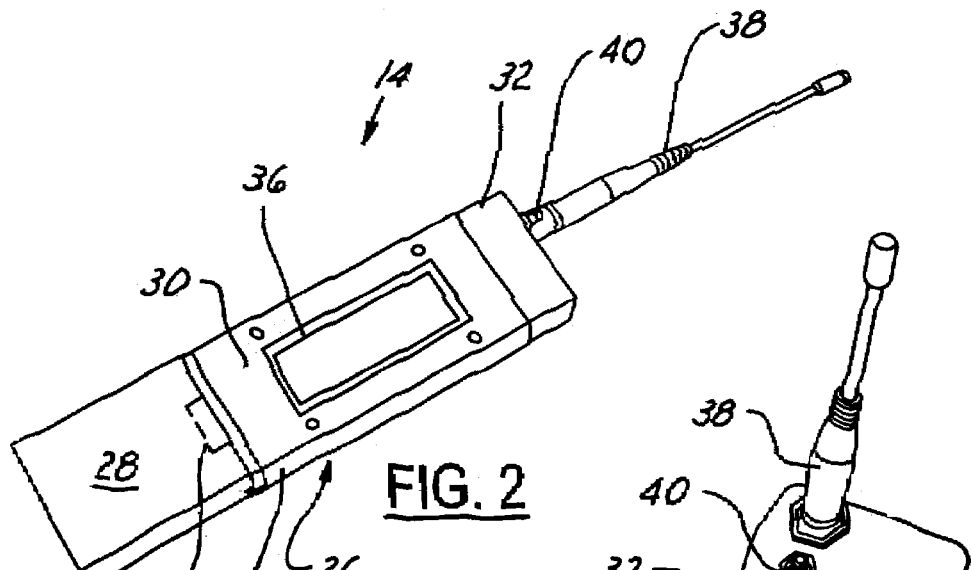
FIG. 2 is a perspective view of a mobile unit according to the present invention.

Referring now to FIG. 2, the mobile unit 14 is illustrated. In this configuration, mobile unit 14 is handheld user 16. Handheld user 16 has a sealed housing 26 that has a battery portion 28, a control and display portion 30, and an antenna mount/cap assembly 32. The battery portion 28 and the control and display portion 30 are coupled together using a connector 34 positioned therebetween. Connector 34 may be exposed if battery pack 28 is removed and a direct power source is coupled thereto. Such an application may be used in a vehicle mounted unit so that the power supply for the rest of the unit becomes the vehicle's power supply.

The control and display portion 30 includes a display 36. Display 36 is preferably a text display. In one constructive embodiment, display 36 was a backlit LCD display. As a default, display 36 displays position information thereon. As will be further described below, when messages are received from the base unit the message signals may be displayed on display 36 as well.

Antenna mount/cap assembly 32 is an interchangeable unit. The antenna mount/cap assembly has an antenna or connector for an antenna for a GPS system and an antenna or connector for an antenna for a wireless modem system as will be further described below. As illustrated, a wireless modem antenna 38 is provided thereon. A single button interface 40 is also disposed on antenna mount/cap assembly. In a constructed embodiment, the single button interface 40 was positioned near wireless modem antenna to help prevent inadvertent activation of the single button interface 40. Single button interface 40 has an extended and compressed position that are used to control the control and display portion 30 which ultimately controls the transmission of mobile unit message signal through the wireless modem antenna 38.

To make the handheld device vehicle mounted, a clip or other fastener may be used to fix the housing to the vehicle. However, removing the battery pack 28 and powering the unit with the vehicle power supply may be performed. Also, the antenna mount/cap assembly may be replaced so that vehicle mounted antennas may be employed.

Figure 3:
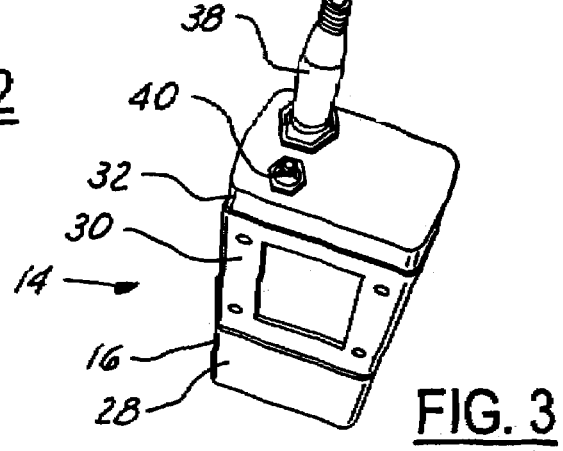
FIG. 3 is a top perspective view of the mobile unit of FIG. 2.

Referring now to FIG. 3, a perspective top view of the antenna mount/cap assembly is illustrated showing the relative position of single button interface 40 and wireless modem antenna 38.

Figure 4:
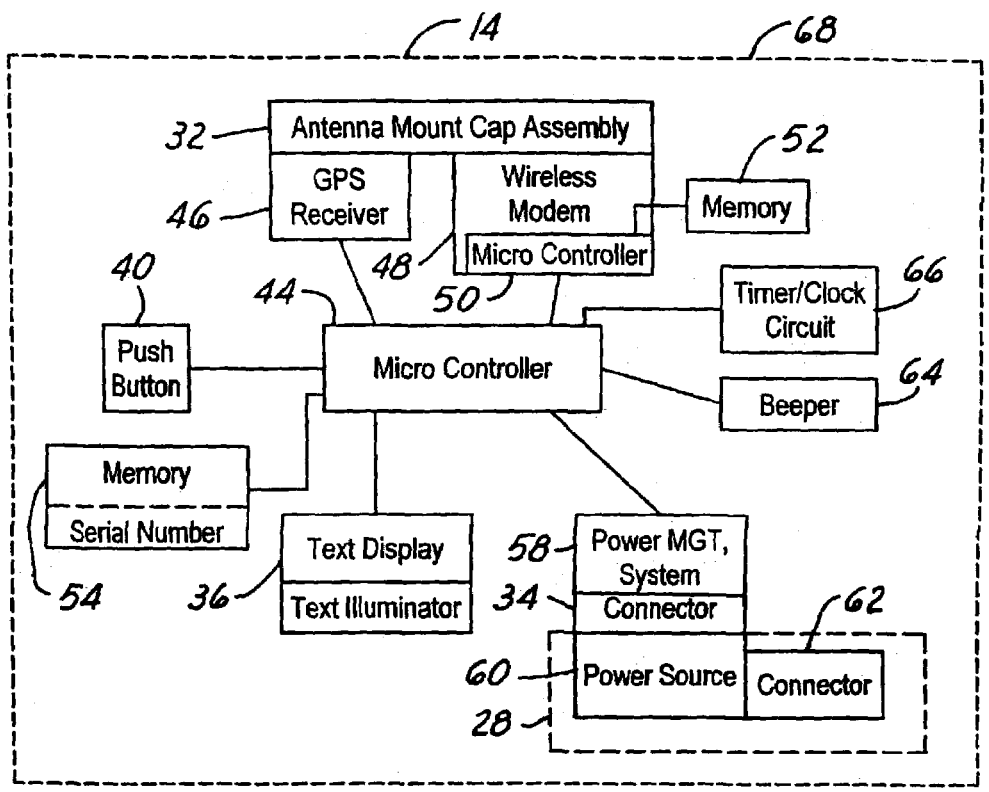
FIG. 4 is a block diagrammatic schematic view of a mobile unit.

Referring now to FIG. 4, a block diagrammatic view of a mobile unit 14 is illustrated. Mobile unit 14 includes a microcontroller 44 that is preferably microprocessor-based. The microcontroller 44 controls the operation of timing between the mobile unit 14 and the base station. The microcontroller 44 may also set the hopping pattern as described below.

Microcontroller 44 is coupled to a GPS receiver 46 and a wireless modem 48. Both the GPS receiver 46 and wireless modem 48 are electrically coupled to antennas or connectors within antenna mount/cap assembly 32 as described below. GPS receiver 48 provides position signals to microcontroller 44. Wireless modem 48 transmits and receives various types of message signals, inquiry signals and position signals thereto and therefrom. Thus, wireless modem 48 acts as a transceiver. Wireless modem 48 may also have a microcontroller 50, which in turn is coupled to a memory 52. The modem 48 may, for example, be a 902-928 MHz frequency hopping spread spectrum modem. Each modem may, for example, generate 115.2 Kbaud and may sustain a 80 Kbits/second information flow. Memory 52 may, for example, be non-volatile memory such as EEPROM. Microcontroller 44 is also coupled to single button interface 40, a memory 54 that may, for example, store various information such as a serial number. Microcontroller 44 is also coupled to text display 36 which may include an illuminator 56. Memory 44 may be a separate component or may be incorporated into microcontroller 50.

Microcontroller 44 may also be coupled to a power management system 58 that includes connector 34 that connects the microcontroller 44 to a power source 60. As mentioned above, power source 60 may include a rechargeable battery such as a nickel cadmium battery. The battery pack may be formed to be a standard type of battery pack such as the Los Angeles County Fire Department's Bendix/King radio battery pack. The power source 60 may include a charge connector 62 used to charge the battery from a rechargeable power source.

Microcontroller 44 may also be coupled to a beeper 64 that generates an audible tone for the unit operator. Beeper 64 may include variable tones. Microcontroller 44 may be programmed to vary the length or the timing of the tones to ensure the unit operator receives the signals. Beeper 64 may signal the presence of a message from the base station.

Microcontroller 44 may also be coupled to a timer/clock circuit 66. Timer/clock circuit 66 may used to time varied functions such as the length of time beeper 64 may be operated. Also, clock 66 may be used to determine when the GPS receiver 46 is to obtain a new position signal. Timer/clock circuit 66 may be a separate component or incorporated integrally with microcontroller 44.

Mobile unit 14 may be positioned within a sealed housing 68. Preferably housing 68 is formed to provide rigidity and reliability to the system. In one constructed embodiment, a sealed aluminum closure was used for housing 68. Antenna mount/cap assembly 32 and battery portion 28 may also be formed in a similar manner. That is, all the components are preferably waterproof and shock resistant.

Figure 5A:
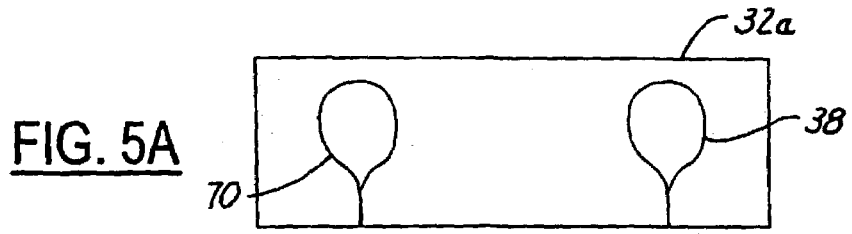
FIGS. 5A, 5B, and 5C are alternative embodiments for the antenna/cap assembly for a mobile unit.

Referring now to FIG. 5A, a first embodiment of an antenna mount/cap assembly is illustrated. In this embodiment, a GPS receiver antenna 70 and a wireless modem antenna 38 are incorporated therein.

Figure 5B:
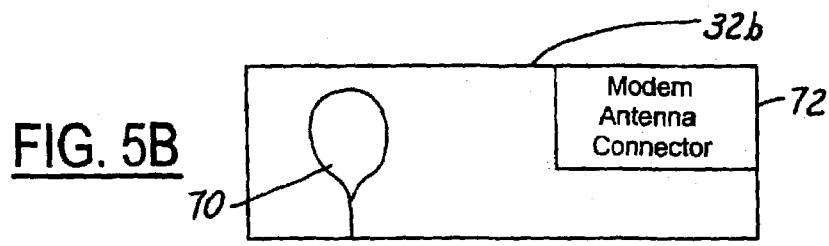

Referring now to FIG. 5B, a second embodiment of antenna mount/cap assembly 32b is illustrated. In this embodiment, a GPS antenna 70 is provided with a modem connector 72. Modem connector 72 may be used to interface to an external antenna (not shown).

Figure 5C:
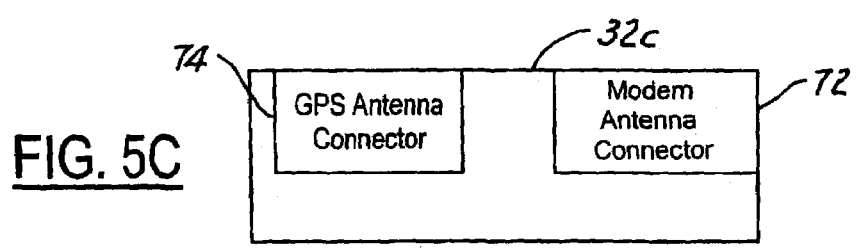

Referring now to FIG. 5C, a third embodiment of an antenna mount/cap assembly 32c is illustrated. In this embodiment, a GPS antenna connector 74 is used together with a modem connector 72. This embodiment is particularly suited for a vehicle user 18 so that both an external GPS antenna and an external modem antenna may be coupled respectively to GPS antenna connector 74 and modem connector 72. Vehicles may have externally mounted antennas to which the antenna mount/cap assembly may be connected.

Figure 6:
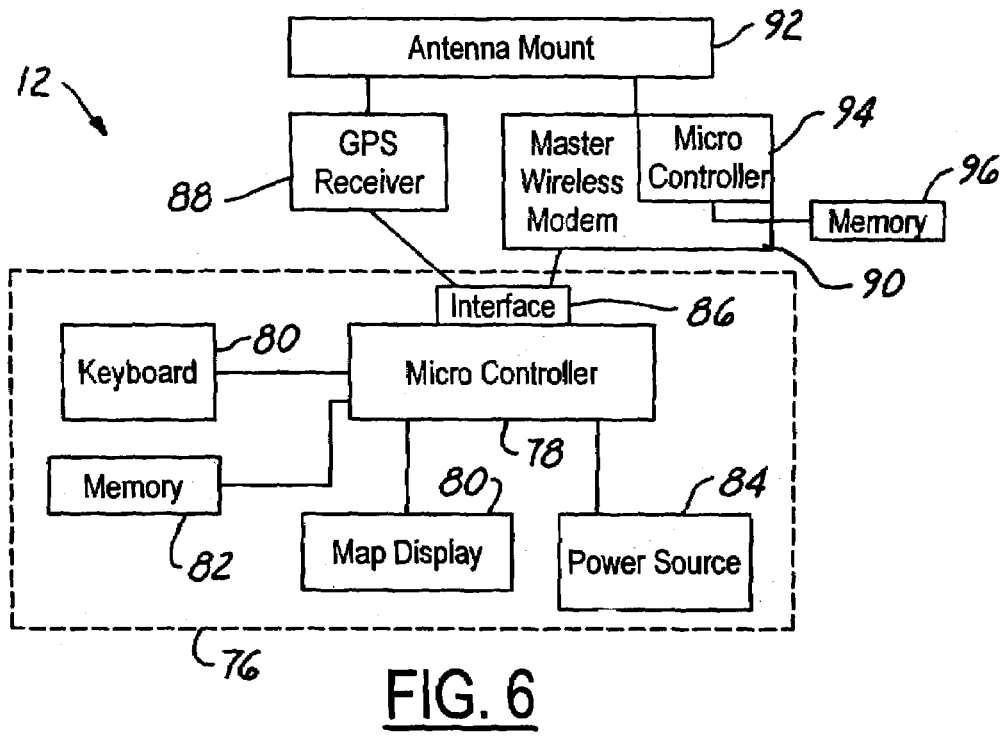
FIG. 6 is a block diagrammatic schematic view of a base station according to the present invention.

Referring now to FIG. 6, base station 12 is illustrated in further detail. Base station 12 may have at least a portion incorporated into a laptop computer 76 or other type of common enclosure. Base station 12 includes a microcontroller 78 that is also preferably microprocessor-based and controls the operation of base station 12. Microcontroller 78 includes a map display 80. Map display 80 may be the screen of the laptop computer that is used to plot the base station position and the positions of the mobile units. Microcontroller 78 may include a data input device such as a keyboard 80, which is standard on laptop computers. A memory 82 may be incorporated into microcontroller 78 or formed as a separate unit. Memory 82 may have a portion that is non-volatile such as an EEPROM. Microcontroller 78 may also be coupled to a power source 84. Power source 84 may, for example, be a DC source between 6 and 35 volts. One example of a suitable power source is a rechargeable battery.

Microcontroller 78 may also have a serial port interface 86 so that microcontroller 78 may couple to other devices such as GPS receiver 88 and master wireless modem 90. Both GPS receiver 88 and master wireless modem 90 may be coupled to an antenna mount 92. Master wireless modem 90 may include a microcontroller 94 and a memory 96 to control the operation thereof. Microcontroller 78 is used to transmit messages through master wireless modem 90. In response to messages received from master wireless modem and GPS receiver 88, microcontroller 78 controls the map display 80.

The base station 12 communicates with each mobile unit. Examples of configuration commands from base station to a mobile unit include:

| | |
|---|---|
| #SHssss0nn | Set hopping pattern to nn. |
| #SUssssnnn | Set unit's unit address to nnn (1-999). |
| #SNssssnnn | Set unit's network address to nnn (0-254). |
| #SSssssnnn | Set the system's sleep time to nnn (0-999). |
| #STssssxxn | Set the system's type ID to n (0-9). |
| #SQssssxxx | Set the modem to "Quick On" mode, where the modem links to the network immediately after power-up. |
| #SDssssnnn | Set the unit's current system default register to the decimal value nnn (0-255). Currently, if bit 0 of this number is 1, this tells the unit it has an external comm. antenna, and the GPS is left powered on all the time. If bit 1 of this number is 1, this tells the unit to store fixes that do not get acknowledged by the base station. Bit 2 turns on and off the repeater configuration. Bit 2 = (1/0) turns the repeater mode for this unit on/off. Bit 3 turns on and off "quiet mode" for the unit. When "quiet mode" is on, the unit does not sound a short beep every time it transmits its position. Bit 3-(1/0) turns "quiet mode" on/off. |
| #SGssssxxx | This puts the unit in GPS test mode, where a direct link is provided between the wireless modem and the GPS. |
| #XCssssxxx | Exit configuration mode. |
| #CFssssxxx | Clear this unit's back-logged (stored) fixes that were not acknowledged. |
| #WSssssxxx | Write the contents of the system default register to non-volatile memory so the current settings will be used even when the power is cycled off then back on. |

In the above commands, any time a # is entered, the system begins parsing a new command. So, if the user makes a mistake typing, he/she should simply re-type the command starting with #. Also, the command characters can be uppercase or lower-case, either will work. Each "ssss" string is a 4-digit hexadecimal number representing the unit's serial number. As said above, serial number 0000 is recognized and processed by all units, so it is a way of globally configuring all units with a single command. The "xxx" strings above are "don't care" sequences, and can be anything—they are ignored by each unit.

After the configuration mode is exited or if no configuration commands are received, the system enters the normal operation mode.

Figure 7:
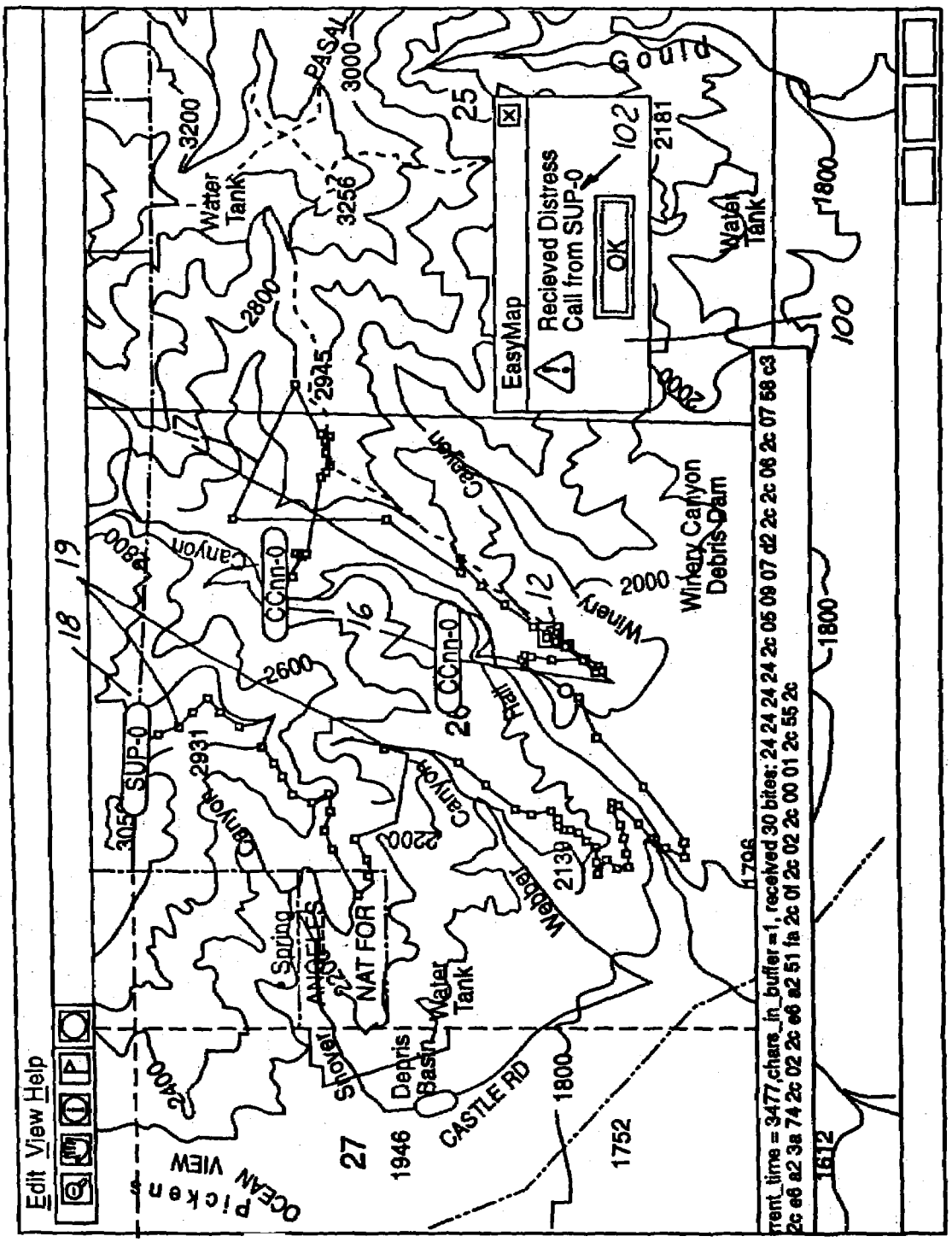
FIG. 7 is a screen printout of a display of the base station of FIG. 6.

Referring now to FIG. 7, a representative example of a screen output of map display 80 is illustrated. As can be seen, screen indicators representing mobile units 14 (handheld users 16 and vehicle users 18) are illustrated relative to base station 12. Vehicle users 18 may have a trail 19 therebehind illustrating past movement. Mobile users 16 have a trail 17 therebehind indicating past positions. These positions make the map a "moving map." Other screen indicators such as map lines 78 illustrate terrain characteristics, roads, and elevational changes in the terrain. As messages are received from mobile units 14, a pop-up box 100 may illustrate the various messages such as a distress call from user terminal having a specific address 102. The address may be numerical or descriptive as set by the base station operator. For example, the mobile unit's operator name may be displayed. Other screen indicators such as colors, flashing symbols and the like may be used to highlight the relative positions of the various resources to be kept track of by base station 12. It should be noted that address 102 may correspond to the address of serial number of the mobile unit 14.

Figure 8:
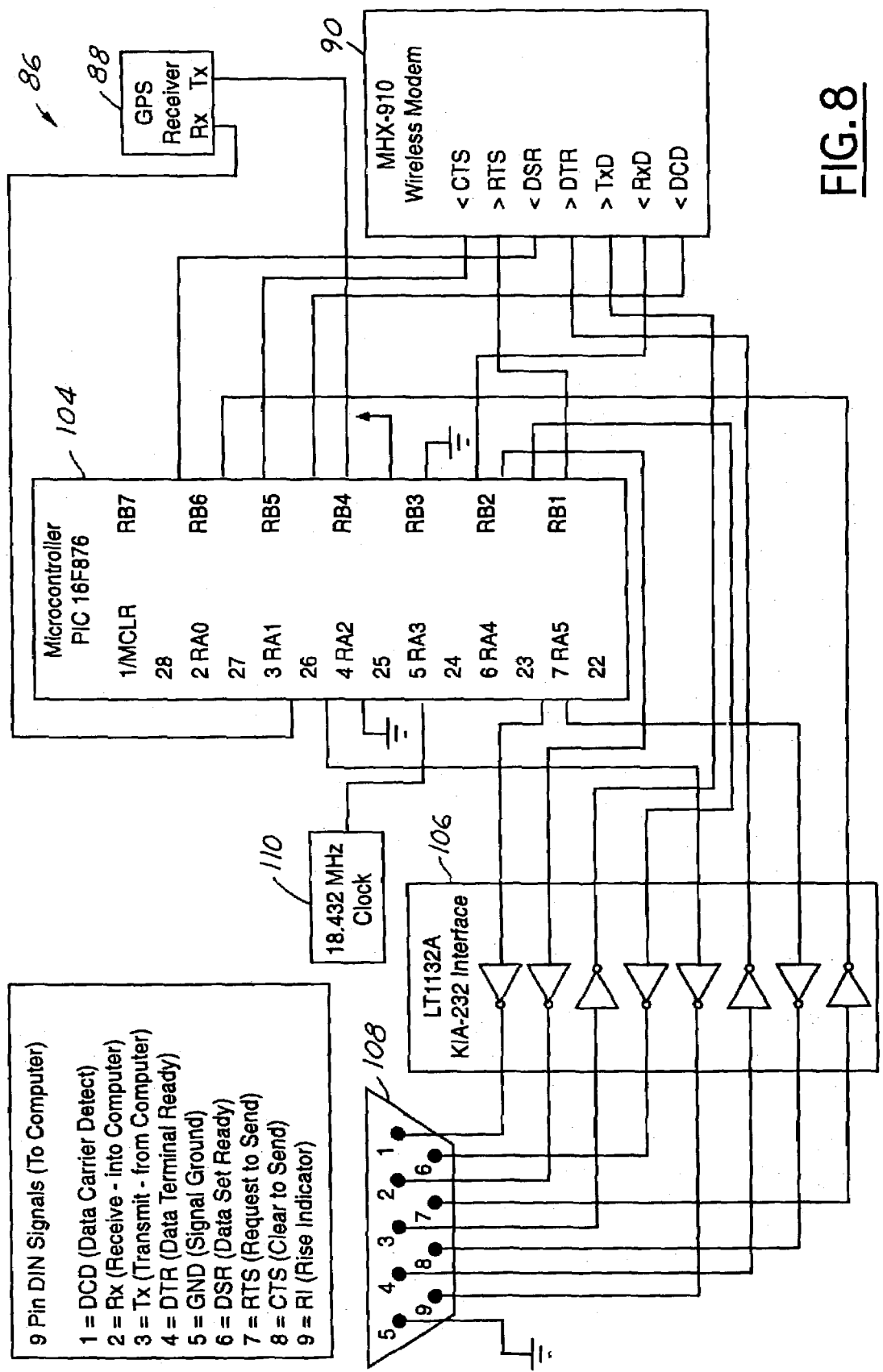
FIG. 8 is a block diagrammatic schematic view of the interface of the base station of FIG. 6.

Referring now to FIG. 8, serial port interface 86 is illustrated in further detail. Serial port interface 86 has a microcontroller 104 that is coupled to GPS receiver 88 and master wireless modem 90. The microcontroller 104 has various inputs RB0 through RB7. The various inputs are coupled to the wireless modem 90 and the GPS receiver 88. Various outputs of wireless modem 90 are also coupled to a level interface 106. Level interface receives signals from microcontroller 104 and wireless modem 90. Level interface 106 is coupled to a connector 108 such as a serial port connector. More specifically, an RS232 connector 108 is illustrated. Such a connector is electrically coupled to the microcontroller 78 of the base station 12. The pins of the connector 108 in one constructed embodiment are coupled as follows: pin 1 is a data carrier select line from the microcontroller 104; pin 2 is a receive line relative to the computer; pin 3 is a transmit line from the computer; pin 4 is a data terminal ready line from the wireless modem 90; pin 5 is a signal ground; pin 6 is a data set ready from the wireless modem; pin 7 is a request to send signal from the microcontroller 104; pin 8 is a clear to send signal from the microcontroller; pin 9 is a ring indicator which also comes from microcontroller 104. Both the outputs of the GPS receiver 88 and the wireless modem 90 are in serial form. A clock 110, such as an 18.432 MHz clock is also coupled to microcontroller 104. This aspect of the invention uses the built-in universal asynchronous receiver/transmitter (UART) of microcontroller 104 to monitor all the serial data coming from the wireless modem and to relay this information to the base station 12. Essentially, microcontroller 104 allows a pause to be placed on the information coming from wireless modem 90 that is destined for RS232 connector 108 and allows a GPS message 88 to be inserted therein. During such hold period, the wireless modem stores information received over the wireless modem 90 and transmits it through microcontroller 104 to RS232 connector 108 after the GPS signal is received. The present invention is hooked up so only information from the GPS receiver 88 may be inserted within the wireless modem stream by pausing the data from the wireless modem 90. However, those skilled in the art will recognize that a reverse scenario may be set up wherein the transmit line from the base station may also be routed through the microcontroller so that information may be inserted therein. However, in this constructed embodiment, this feature was not necessary or required.

Figure 9:
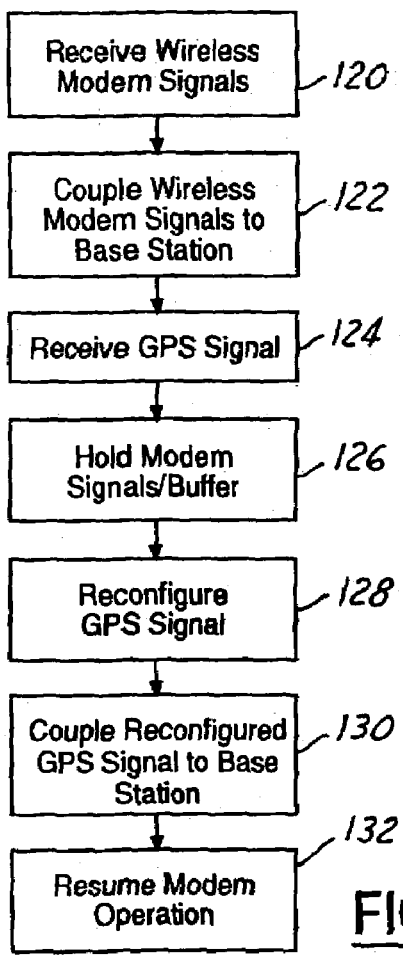
FIG. 9 is a flow chart of the operation of the base station.

Referring now to FIG. 9, the operation of the serial port interface 86 is illustrated. In step 120, wireless modem signals are received from wireless modem 90. The wireless modem signals are coupled to the base station 12 in step 122. When a GPS signal is received in step 124, the wireless modem is told to hold the modem signals. That is, the modem has an internal buffer which is used to store the data while the GPS signal is being received. When the modem is told to hold in step 126, the RTS line of the modem 90 is de-asserted so that the modem knows to hold its data. The data from the wireless modem may be thought of as a first plurality of data that is interrupted with a GPS signal. That is, the data from the wireless modem has a first data before the GPS signal and second data after the GPS signal.

In step 128, the GPS position signal is reconfigured. The GPS signal is formatted like a wireless modem signal that has an identifier that indicates that the signal is from the base station. Thus, when the base station receives the signal, it is plotted on the map display just as any other wireless modem signal. Thus, the base station is tricked into thinking that the data from the GPS receiver 88 is from wireless modem 90. The reconfigured GPS signal is thus coupled to base station in step 130. In step 132, the modem operation is resumed by reasserting the RTS line. Thus, normal two-way data transfer is thus resumed through wireless modem 90. Also it should be noted that because the base station recognizes the ID code as being from the base station, an acknowledge signal for the position signal of the base station from GPS receiver 88 is not performed. It should also be noted that the wireless modem signals have a wireless modem format. The GPS signal is converted to a wireless modem format signal essentially to trick the base station into thinking it is coming from the wireless modem.

Figure 10:
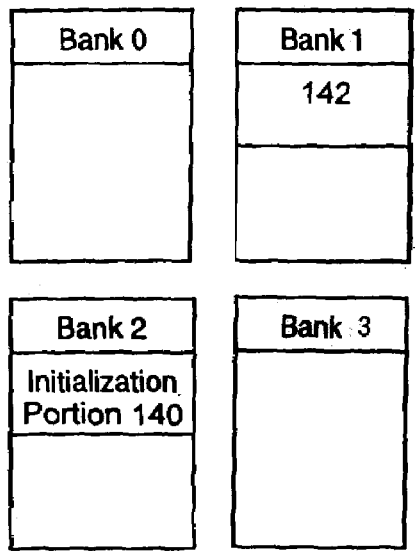
FIG. 10 is a schematic representation of three banks of memory used in the present invention.

Referring now to FIG. 10, the program memory may be divided up into various banks: bank 0, bank 1, and bank 2. Bank 2 may, for example, contain the initialization portion 134 while the operational portion 135 may be positioned in bank 1. The microcontroller 44 of the mobile unit 14 begins executing the program address at 0000. In the present configuration there is room for four instructions between 0000 and 0003, while address 0004 is reserved for interrupts. Thus, the first four microcontrollers instructions are as follows:

| | | | |
|---|---|---|---|
| reset | org | 0.0000 | ;Reset starts here. |
| | bsf | pclath,4 | ;The B2init subroutine is in Program Memory Bank 2. |
| Icaddr | call | B2init | ;The B2init routine sets up Defaults then erases this call. |
| | bcf | pclath,4 | ;Back to Program Memory Bank 0. |
| | goto | start | ;Start running. |
| | org | 0.0004 | ;This is the interrupt vector. Any interrupt brings us here. ;The only interrupt expected is a start bit on RB0/INT. |

It should be noted that calling either bank 1 or bank 2 requires only setting one bit in the pclath instruction. Thus, only two instructions are required. Thus, it is not desirable to put the routine in bank 3 because an extra bit requiring more than one instruction would be required.

Figure 11:
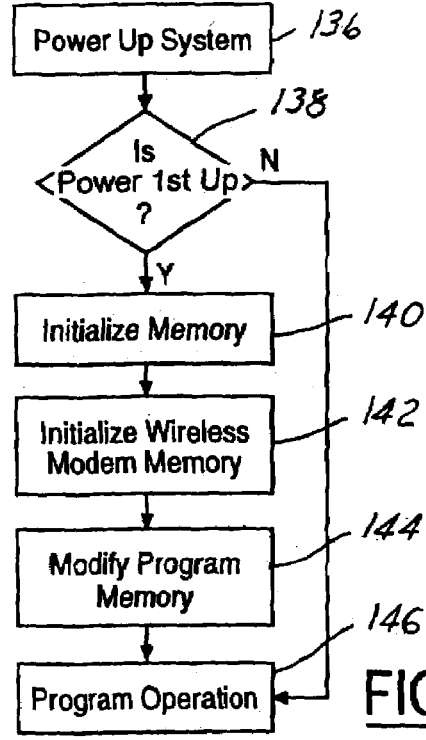
FIG. 11 is a flow chart of a memory initialization of the present invention.

Referring now to FIG. 11, the initialization routine is illustrated. In step 136, the system is powered up. On power up the system display may be set to display identifying information such as its network address, unit address, primary hopping pattern, secondary hopping pattern, and encryption key. If this is a first power up in step 138, step 140 is executed. This decision block will actually take care of itself as will be further described below and is not an actual step. In step 140 the memories are initialized. In step 142, the wireless modem memory is initialized. In step 144, the program modifies itself using a "no operation" instruction. From the program code described above, the B2init routine sets up default and then erases the call by changing the call to a no operation instruction. That is, the program is modified so that the icaddr address is set to zero, which is a no operational instruction. Thus, the next time the system is powered up this instruction will be skipped since now it is a no operation instruction. The initialization program thus never gets called again. In step 146, the remainder of the program operates in a normal manner. In a second time through the device because of the no operation instruction, step 146 is executed directly after step 136. This aspect of the invention is advantageous to prevent rewriting of the EEPROM needlessly. Thus, upon the operation of a spurious power supply the system does not need to reset or rewrite the memory. As mentioned above, a typical program EEPOM may be rewritten about 1,000 times in its useful life. Data EEPROM may be rewritten about 10,000 times.

Figure 12:
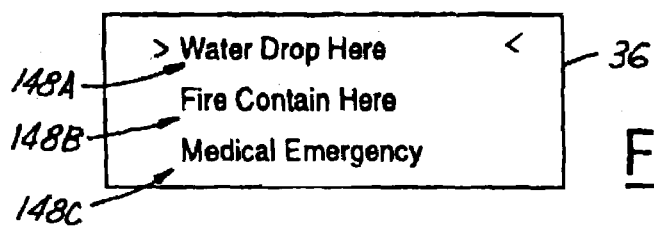
FIG. 12 is a representation of a text display for a mobile unit.

Referring now to FIG. 12, as mentioned above, the present invention communicates two ways between the base station and each mobile unit 12. Of course, the specific application for which the mobile units will be used may dictate different command messages. During the course of operations, it may be desirable to change the messages. For example, the messages may be changed upon initial power up, at the beginning of the day. This will allow crews to have updated messages for the day's work. In FIG. 12, an example of display 36 is illustrated having various commands 148a, 148b, and 148c.

Figure 13:
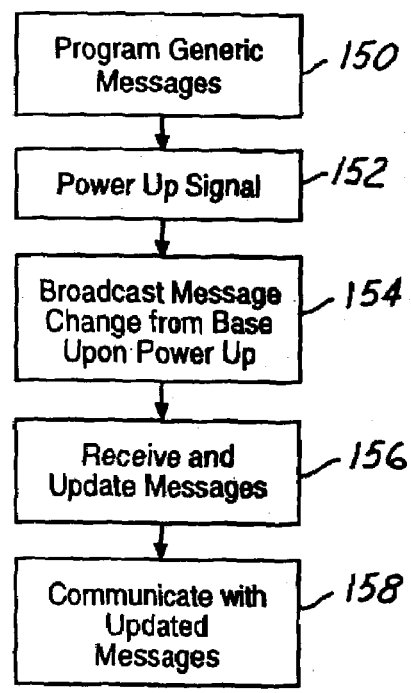
FIG. 13 is a flow chart of a method to update outgoing messages of a mobile unit.

FIG. 13 illustrates a method for programming the messages. In step 150, the generic messages are programmed within the memory. This may take place during manufacture of the device. In step 152, the system is powered up within a system and a signal is sent to the base station. The base station in step 154 receives the signal and places the device on the map display. The power up signal 152 may include or be used as an inquiry signal so that the base stations knows message changes may be generated to the base. In step 154, the base stations broadcast message changes from the base station when receiving the power up signal in step 152. The messages are received by the mobile unit in step 156. The operation of the system using the updated messages is performed in step 158.

Figure 14:
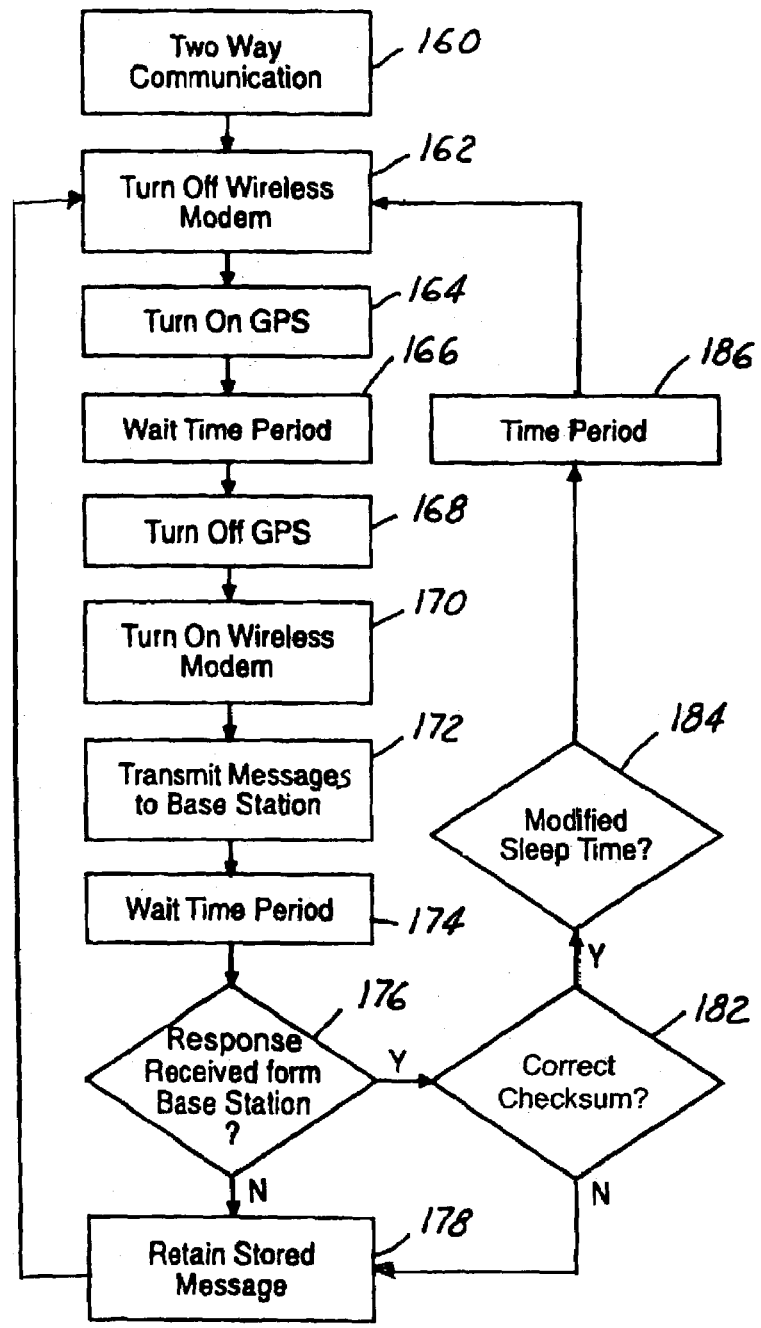
FIG. 14 is a flow chart of the operation of the mobile unit.

Referring now to FIG. 14, a more detailed operation of the method for operating a mobile unit is described. During operation, two-way communication is normally performed in step 160. In step 162, the wireless modem is turned off or held as described above. In step 164, the GPS is turned on. This routine prevents the wireless modem and the GPS from interfering with each other. In step 166, a time period is waited for the GPS signal to be received. As an alternative, rather than a time period, a check for a coherent GPS signal may be used. In step 168, the GPS receiver, once a signal is received, is turned off. In step 170, the wireless modem is turned on or removed from the hold status. In step 172 the message from the mobile unit is transmitted to the base station. In step 174, the message is retained at the mobile unit and a time period is allowed to pass in step 174. In step 176, a check is determined whether a response has been received from the base station. If a response has not been received, the message is retained in step 178. The message is retransmitted to the base station using the sequence in step 162 with older messages transferred first. Referring back to step 176, if a response has been received from the base station, the checksum associated with the response is checked in step 182. If the response does not have a proper checksum, then step 178 is executed. In step 182, if a proper checksum has been received, the portable unit determines whether or not the sleep time of the GPS receiver has been modified. The sleep time is the amount of time between transmissions of the position messages from the GPS. When turning a unit on the sleep time starts after an initial valid message (fix) is received. The modified sleep time is checked in step 184. In step 186, the time period to wait before checking the GPS receiver is waited in step 186 and thereafter step 182 is executed in which the wireless modem is turned off and the GPS is again checked. The battery life may also be transmitted. Formatting for the communication may be performed with the following format:

$$$$$, DATE, TIME, XmitCount, Latitude, Longitude, PDOP, Type, ID, Battery %, (Message ID correctly received), (Acknowledge Code), Checksum Where:

"$$$$$," is the message header.

All dates and times are GMT. DATE is a 4 byte number, consisting of DMYY, where:

D=Day, 1-byte binary number from 1-31.

M=Month, 1-byte binary number from 1-12.

YY=Year, 2-byte binary number from 2002-2047.

TIME is a 3-byte number, consisting of HMS, where:

H=Hour, 1-byte binary number from 0-23.

M=Minute, 1-byte binary number from 0-59.

S=Seconds, 1-byte binary number from 0-59.

XmitCount is a 1-byte transmission counter tagged to each message.

Latitude is a signed binary number in Motorola's binary format. It ranges from −324,000,000 to 324,000,000, corresponding to −90 to +90 degrees. A positive number corresponds to north latitude.

Longitude is a signed binary number in Motorola's binary format. It ranges from −648,000,000 to 648,000,000, corresponding to −180 to +180 degrees. A negative number corresponds to west longitude.

PDOP is the Position Dilution of Precision, a single byte ranging from 0 to 255. A value of zero indicates that the GPS receiver does not have a fix (a valid position). The values of 1-255 correspond to 0.1 to 25.5.

Type is a 1-byte number that tells what type of transponder unit sent the message. Currently, there are five different recognized types: handheld unit, ground vehicle, fixed-wing aircraft, helicopter, and base station.

ID is a unique ID number for each system. It is a 2-byte unsigned binary number corresponding to the serial number of the unit.

Battery % is the percentage of battery life remaining. This 1-byte number can be from 0-255, corresponding to 0% to 255%. For systems connected to an external power source, it is common to see a battery life of around 105-115%.

The "Message ID Correctly Received" field is a 2-byte number corresponding to the ID code of a message attached to an acknowledge from the base station. If the base station sends the unit a page/message, it does so by attaching it to an acknowledge message and tagging it with a non-zero ID code. When a field unit correctly receives a message, it puts the ID code in this field on its next fix transmission.

The "Acknowledge Code" is a 4-byte number for sending additional information from the field unit to the base station. Note that this is also the code used to send custom messages from the handheld unit to the base station.

The Checksum is a 1-byte exclusive-OR of all of the bytes in the message starting with the first byte in the DATE field (the month) and ending with the last comma (before the checksum).

One version of the system may add GPS Height, 3 d and 2 d GPS Speed, and GPS heading for the following, modified format:

$$$$$, DATE, TIME, XmitCount, Latitude, Longitude, GPS Height, 3 d Speed, 2 d, Speed, GPS Heading, PDOP, Type, ID, Battery %, (Message ID correctly received), (Acknowledge Code), Checksum Where:

GPS Height is a 4-byte number in Motorola's binary GPS height format, in cm 3 d Speed and 2 d Speed are 2-byte numbers in Motorola's binary GPS speed format in cm/s GPS Heading is a 2-byte number in Motorola's binary GPS heading format, in tenths of degrees, from 0 to 3599, corresponding to 0.0 to 359.9 degrees true.

Notice that the commas separating each field are not really necessary for operation, but are quite useful during development of a system using this protocol, since they make debugging, troubleshooting, and programming much easier. After development is complete, the commas can be removed to shorten the message length.

It should be noted that a constructed embodiment of the invention is able to retain up to 19 stored position signals in step 178. When the oldest signal is received properly by the base station, the next oldest is attempted until a successful signal has been sent. Thus, the base station provides an updated moving map of each of the positions of the mobile units. The base station response consists of 5 bytes with the following format:

| 0xff | ID | FixCount | Page/Message-flag | Checksum |
| --- | --- | --- | --- | --- |

Notice that there are no commas separating each byte, and also notice that the first byte is 255, or 0xff (hexadecimal). This number is used to indicate that the acknowledge message follows, and each handheld device, upon receiving 0xff, resets its acknowledge code parsing routine. This also means that 0xff must not appear anywhere else in the message, including in the checksum. This is done by eliminating all 0xff bytes from each serial number, by making sure the FixCount is never 0xff, and by manipulating the bits in the Page/Message flag so that, it is never 0xff and the Checksum is never 0xff. Bit 6 of the Page/Message flag Q is cleared (0) so that it can never be 0xff, and make bit 7 (the most significant bit) of the Page/Message flag whatever it takes to make the Checksum bit 7=0, so that the Checksum can never be 0xff. This scheme has been tested and has been found to maximize the reliability of "round-trip" communications in the presence of noise, and where some bytes can get lost or corrupted. If bit 0 (the least significant bit) of the Page/Message flag is 1, then a message follows the Checksum with the following format:

| Message ID | <80 character ASCII message> | Checksum |

Again, notice that there are no commas in the response from the base station. The message ID is a 2-/byte number that the handheld unit will respond with in the "message ID correctly received" field of the outgoing position message the next time a position update is sent. This tells the base station that the message with the same ID was correctly received by the handheld unit. The 80 character message is 4 lines of 20 characters that the handheld unit displays on the text display upon receiving it.

If bit 0 of the Page/Message flag is 0, but bit 1 of the Page/Message flag is 1, then an updated "sleep time" command follows. Recall that the sleep time is the time that the handheld unit turns off the modem and turns on the GPS between position message transmissions. If bit 0 of the Page/Message flag is 1, indicating that a Page/Message follows, bit 1 is ignored, so the system cannot update the sleep time and display a message simultaneously. If bit 0 is 0 and bit 1 is 1, then the following sleep time update format follows the acknowledge:
Sleep time Sleep time Sleep time which is simply a 1-byte number, the sleep time, repeated three times. If the handheld unit does not receive the same number in triplicate, it is assumed that there was an error in updating the sleep time and the command is ignored. The sleep time number is between 0 and 255, and corresponds to the number of seconds times 2 that the system waits between position fix transmissions. Notice that a value of zero corresponds to 256*2 or 512 seconds. A value of 1 is a special case that actually does update at 1 Hz, but is typically only used for the HiVAL in Field Test Range applications.

Notice that the outgoing handheld messages are pre-programmed messages that are represented by codes in the 4-byte "Acknowledge Code" embedded in the position/fix message. There are over 4 billion possible unique messages that could be represented by this 4-byte number, and it is unlikely that we would ever need to store more than 256, so one byte can be used as the message and the other 3 bytes as parameters for future expansion.

Figure 15:
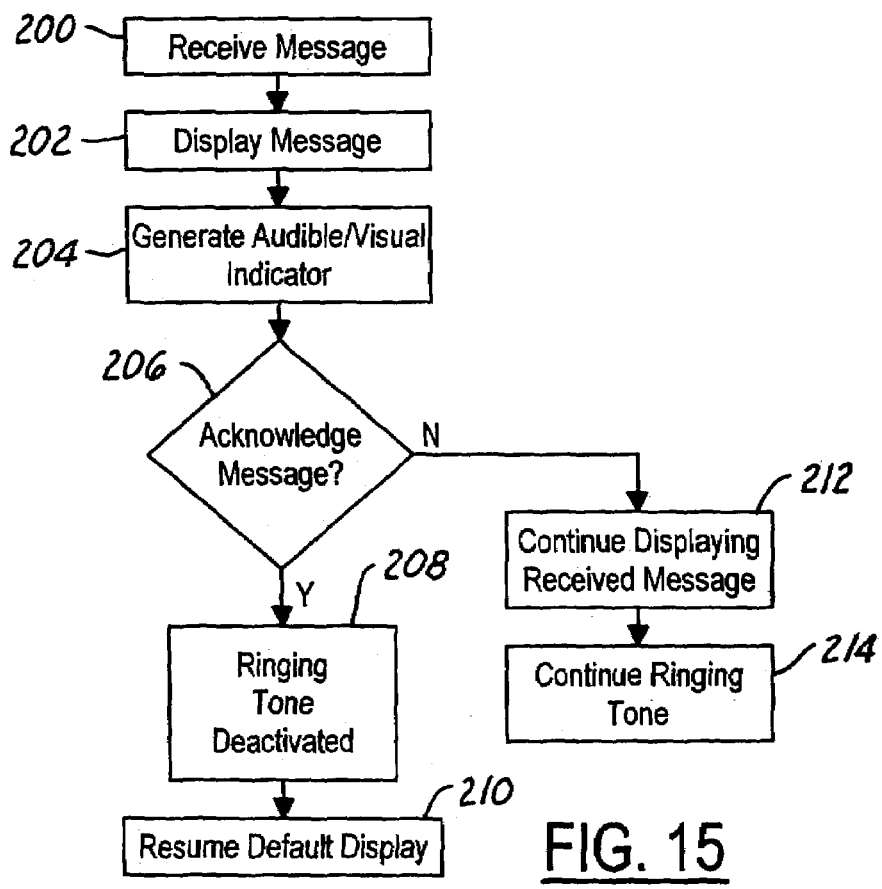
FIG. 15 is a flow chart of the operation of the mobile unit when receiving a message.

Referring now to FIG. 15, there are two basic modes of operation. In a first mode of operation, updated position signals are continuously displayed on the device. When messages are received, the message from the base station is displayed on the display. In a second mode of operation the user activates the button to transmit a message to the base station. FIG. 15 illustrates the first mode of operation. In step 200, a message from the base station is received. In step 202 the message is displayed preferably so that the position information is no longer present on the display. In step 204, an audible and visual indicator is provided. That is, the visual aspect of displaying the message such as in step 202 and an audible indicator is activating the beeper 64 shown in FIG. 4. In step 206, if the button is depressed to a first position in step 206 acknowledging the message and released, step 208 deactivates the ringing tone and resumes the default display in step 210. Referring back to step 206, if the message is not acknowledged the received message is continually displayed in step 212 and the ringing tone continues in step 214. The system may also be set up so that the depression of the button stays on the screen until the one single button interface is released. A default display may be shown as follows:

| GPS | 3dFix | 3.2 | 0/12 |
| 03 Sep 2002 | | 15:59:05 | |
| 35° 08.1342'N | | | |
| 106° 44.3321'W | | B100% | |

Messages sent by the base station may take the form of:
Test Message.
Messages look
like this on the LCD
of the handheld unit Such a message may be typed using a keyboard into a popup box after clicking on the desired unit to send it to. When the mobile unit receives the message, the exact same messages L will be performed on the portable unit display. Alternating beeps between a ringing and warbling tone may also be used as the ringing tone. In one constructive embodiment, if the user depresses the single button interface, the ringing tone is changed to a single short beep to indicate partial acknowledgement. Status messages may also be displayed.

When the handheld unit sends its next position fix, the laptop display may also update to show the updated position.

Figure 16:
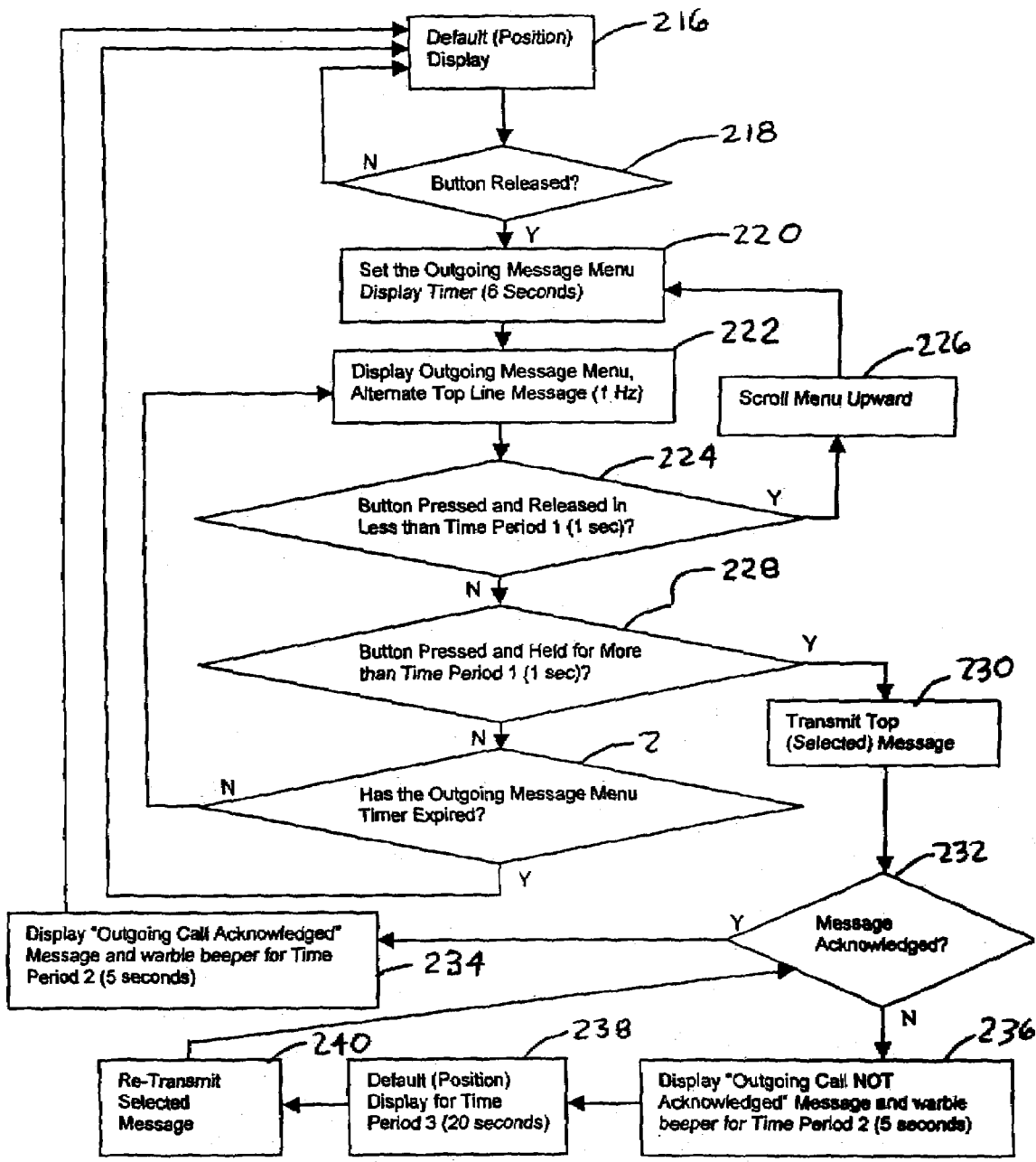
FIG. 16 is a flow chart of the operation for receiving a message in a mobile device.

Referring now to FIG. 16, a second mode of operation described above is illustrated in flow chart form. In this embodiment, the default display is displayed in step 216. If the button is not being depressed in step 218 the default display continues in step 216. If the button is depressed, step 220 is activated. In step 220 a display timer (6 seconds) is set. Thereafter, in step 222 a menu appears that has an alternating top message to provide the user with an instruction to press and hold to select a message to be sent. It should be noted that the menus may vary for each unit or unit type as the situation requires. One example of a message display is illustrated in the format:
Press & Hold-Select
\>Send Distress Call<
Request Evacuation
Water Drop Here At this point the button is still depressed. When the button is released in step 222 in less than one second in step 224, the menu scrolls upward in step 226. The alternating message and menu is continued to be displayed in step 220. A message is selected in step 228 by holding the button for more than one second (or other predetermined time) with a code corresponding to a highlighted message. The highlighted message may be between carats and may, for example, be the top line of the display. In step 230 the message is transmitted to the base station. In step 228, if the outgoing message has expired the position is displayed by returning back to step 216. In step 232 an acknowledgement is waited for from the base station by the mobile unit. If the outgoing message is acknowledged in step 234, the text display on the mobile unit may, for example, have the format:
\>Send Distress Call<
acknowledged!
*****************
Click to resume . . .

Other features such as the beeper warbling three times at approximately 0.2 intervals may also be generated. When the user releases the button the status message such as that shown above is erased and the position information is provided in step 216. Referring back to step 232, if the signal is not acknowledged the mobile unit may display an "not acknowledged display", display the position information for a time in step 238, and retransmit the information in step 240. When a message is sent to a base station, the base station number and the message may be displayed in a popup window so that action may be taken by the base station operators. During the retransmission, a retransmission message may continually be displayed such as "will keep trying every 20 seconds." Tones may also continue to be generated to indicate the mobile unit is continually trying to transmit the message to the base station.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. A method of operating a communication device having a transmitting device with an antenna for sending wireless signals which is in proximity to a GPS signal receiver with an antenna for periodically receiving external signals for GPS position determination comprising:

putting the transmitting device into a sleep mode of predetermined time duration in which it does not transmit wireless signals during a time period in which the GPS signal receiver is receiving external signals for GPS position determination;

checking whether the GPS signal receiver has obtained a position fix from the external signals for GPS position determination; and reactivating the transmitting device to transmit wireless signals only when both of the following conditions are met:

the predetermined time duration for the sleep mode has lapsed, and the GPS signal receiver has obtained a position fix for GPS position determination.

2. A method as recited in claim 1 further comprising waiting a predetermined amount of time before resuming operation of the transmitting device after receiving the GPS signals.

3. A method as recited in claim 1 wherein said predetermined amount of time corresponds to a time for obtaining a position fix from the received GPS signals.

4. A method as recited in claim 1 further comprising:

deriving a position fix from the GPS signals and transmitting the position fix to a base station;

receiving a response signal from the base station;

checking a checksum from the response signal to confirm that the position fix was properly received by the base station.

5. A method as recited in claim 4 further comprising updating a position fix display on the communication device when the check sum is a proper checksum.

6. A method as recited in claim 1 wherein the communication device is a mobile unit.

7. A method as recited in claim 1 wherein the transmitting device is a wireless modem.

8. A communication device comprising:

a transmitting device with an antenna for sending wireless signals which is in proximity to a GPS signal receiver;

a GPS signal receiver with an antenna for periodically receiving external signals for GPS position determination comprising:

a receiving device periodically receiving a plurality of GPS position signals;

a controller coupled to the GPS signal receiver and the transmitting device, said controller having a programmed control sequence for:

putting the transmitting device into a sleep mode of predetermined time duration in which it does not transmit wireless signals during a time period in which the GPS signal receiver is receiving external signals for GPS position determination;

checking whether the GPS signal receiver has obtained a position fix from the external signals for GPS position determination; and reactivating the transmitting device to transmit wireless signals only when both of the following conditions are met:

the predetermined time duration for the sleep mode has lapsed, and the GPS signal receiver has obtained a position fix for GPS position determination.

9. A communication device as recited in claim 8 wherein upon reactivation the transmitting device transmits a position fix derived from the GPS signals to a base station.

10. A communication device as recited in claim 9 wherein the transmitting device receives a response signal to the position fix transmission from the base station having a checksum.

11. A communication device as recited in claim 10 further comprising a position fix display, said controller changing the position fix display on the communication device when the check sum is a proper checksum.

12. A communication device as recited in claim 8 wherein the transmitting device is a wireless modem.

13. A method of operating a communication device having a transmitting device with an antenna for sending wireless signals which is in proximity to a GPS signal receiver with an antenna for periodically receiving external signals for GPS position determination comprising:

putting operation of the transmitting device on hold for a predetermined time duration;

thereafter, turning on the GPS signal receiver and obtaining a position fix;

thereafter, turning off the GPS signal receiver; and then reactivating operation of the transmitting device after the predetermined time duration has elapsed.

14. A method as recited in claim 13 further comprising transmitting the position fix as a wireless signal sent by the transmitting device to a base station.

15. A method as recited in claim 14 further comprising receiving a response signal from the base station having a checksum to validate reception of the position fix sent as the wireless signal.

16. A method as recited in claim 15 further comprising storing the position fix information by the communication device until the checksum is received to confirm that the position fix signal was properly received by the base station.

17. A method as recited in claim 16 further comprising changing a display of the position fix on the communication device when the check sum is confirmed as a proper checksum.

* * * * *